Nov. 4, 1941.  D. A. DICKEY  2,261,145
SYNCHRONIZING MECHANISM
Filed Oct. 8, 1937  4 Sheets-Sheet 2
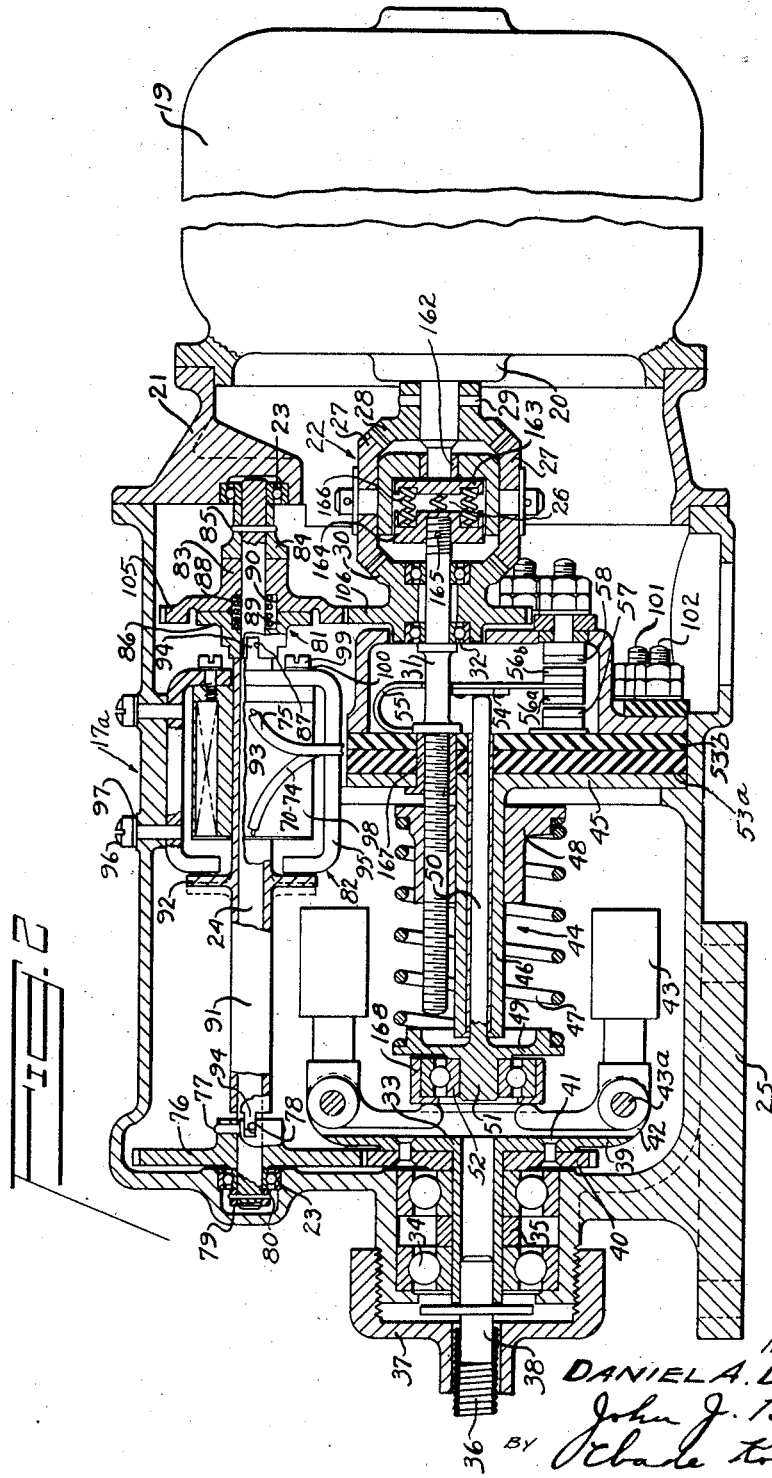
INVENTOR
DANIEL A. DICKEY
BY John J. Hynes
and Chade Koontz
ATTORNEYS

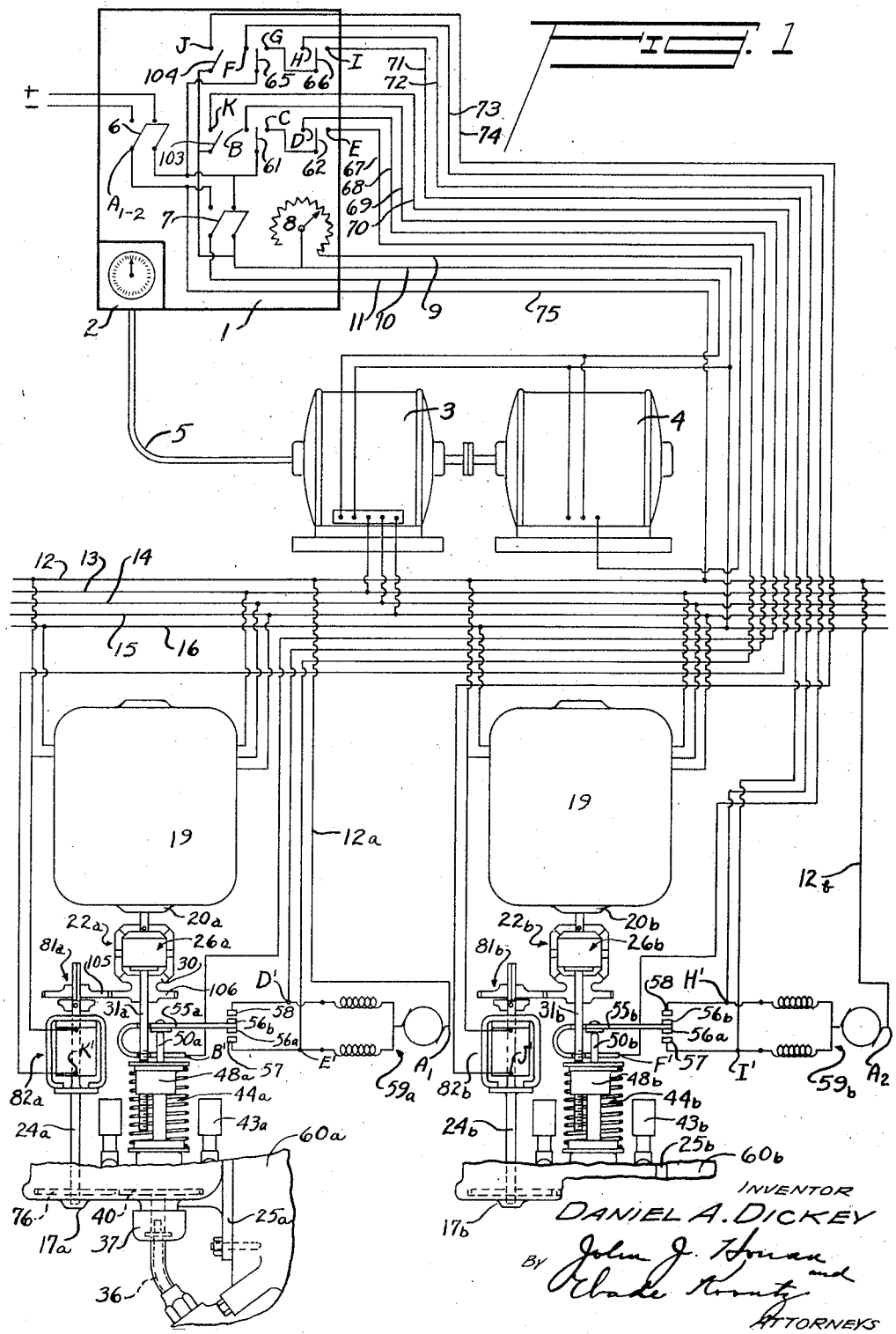

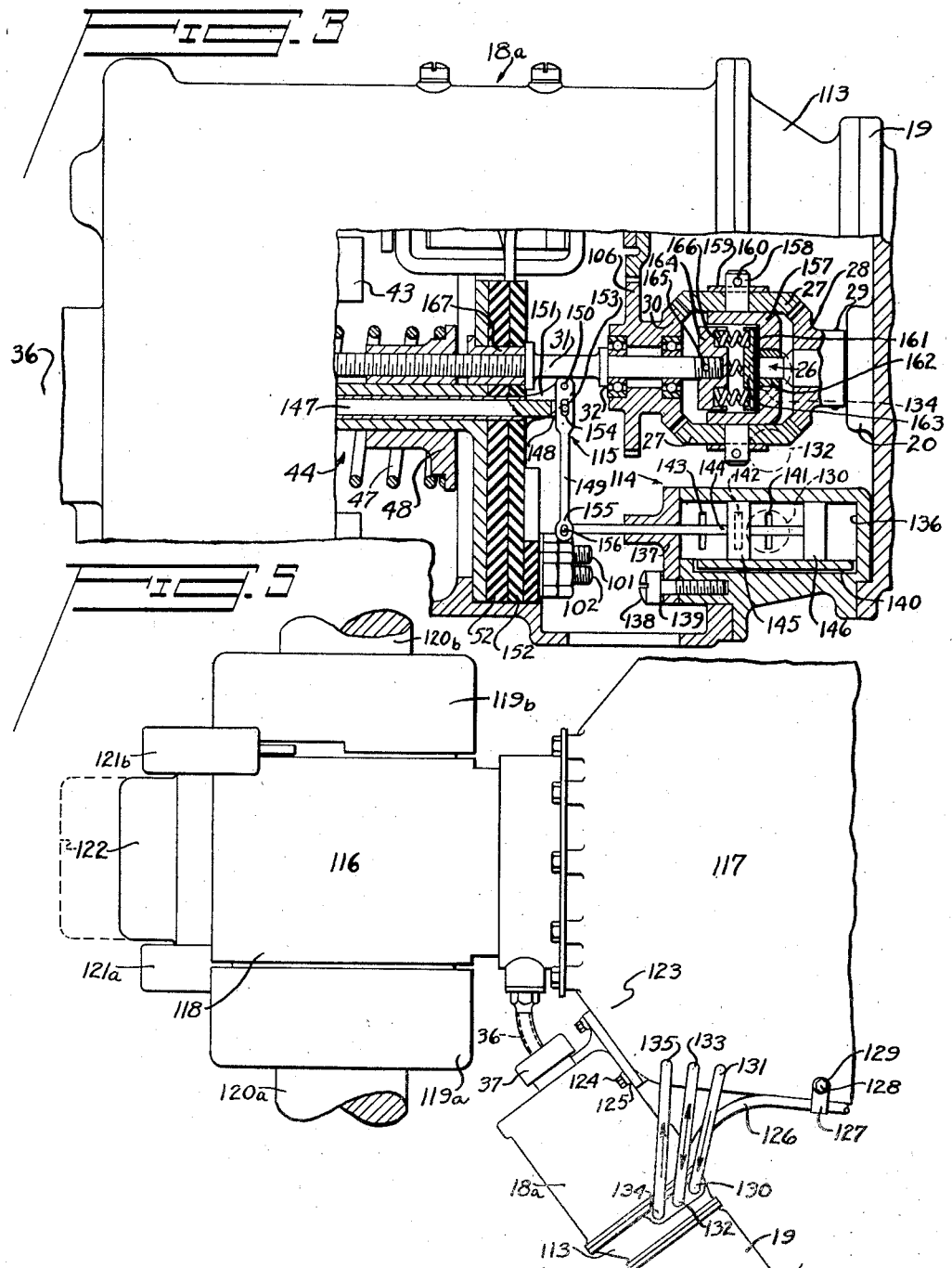

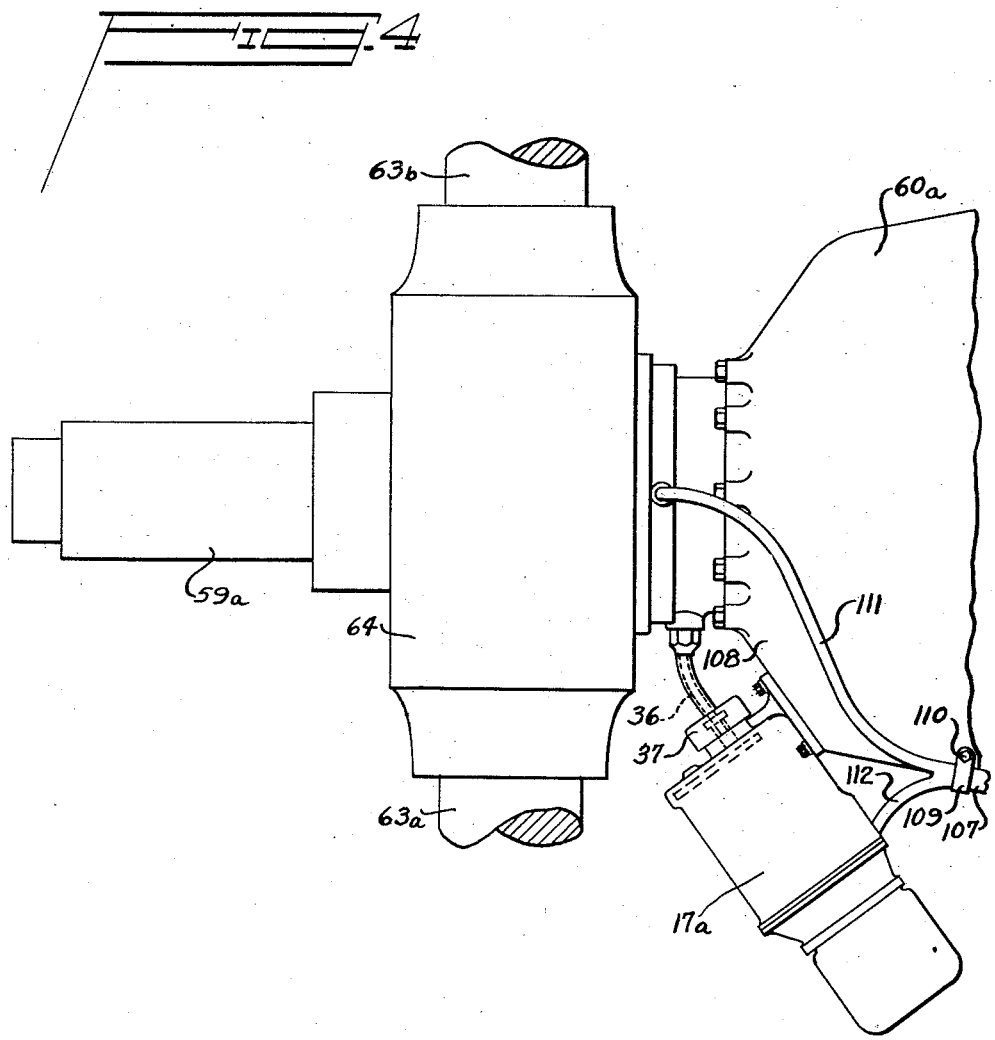

Patented Nov. 4, 1941

2,261,145

UNITED STATES PATENT OFFICE 2,261,145

SYNCHRONIZING MECHANISM

Daniel A. Dickey, Dayton, Ohio

Application October 8, 1937, Serial No. 168,025

10 Claims. (Cl. 170—135.6)

(Granted under the act of March 3, 1883, as amended April 30, 1928; 370 O. G. 757)

The invention described herein may be manufactured and used by or for the Government for governmental purposes, without the payment to me of any royalty thereon.

It is an object of my invention to synchronize a plurality of prime movers which during normal operation may vary in revolutions per unit of time from one another or from a master speed of rotation device.

More specifically, my invention relates to apparatus for synchronizing a plurality of such prime movers as those encountered in multi-engined aircraft power plants in order to reduce to a minimum structural vibrations and auditory fatigue caused by the operation of the engines of such power plants out of synchronism.

It is well known to those skilled in the art that aircraft employing multi-engined power plants having more than one propeller, are subject to a very disagreeable "beat" or drumming noise whenever one or more engines rise above or fall below the operating revolutions of the power plant as a whole. The aforesaid phenomena subjects the personnel operating the aircraft to severe auditory fatigue and may set up destructive vibrations in the aircraft structure itself.

In aircraft employing only two propellers, it is a comparatively simple matter to eliminate beat phenomena due to engine revolution inequalities by merely varying the speed of revolution of one of the aforesaid engines until the "beat" disappears. However, when three or more propellers are employed, it will be readily seen that elimination of the beat phenomena becomes a highly complicated matter because of the fact that it is extremely difficult for operating personnel of the aircraft to tell which propellers are causing the "beat." Previously, therefore, this difficulty has proven a serious drawback to the extended use of airplanes having three or more independently driven propellers, particularly for use in carrying passengers. The safety feature introduced by the greater number of independently driven propellers, however, is extremely desirable.

It is of course possible to set engine revolutions approximately the same by using the tachometers attached to each engine, but it is impossible with tachometers alone to set engine revolutions close enough to a master revolution indicator to eliminate the objectionable "beat" referred to above for the reason that mechanical tachometers only read within "fifteen" and electric tachometers only read within "fifty" revolutions of the true turning rate of the motor to which they are applied, while as little as a "five" revolutions difference in the turning rate of multi-engined power plants will produce the beat phenomena.

It is a still further object of my invention to automatically synchronize the engine revolutions of multi-engined aircraft power plants.

I further propose to automatically adjust the springs of the governors of automatic propeller pitch control systems so as to give each governor spring the exact adjustment necessary to make the governor correct the engine speed exactly to that maintained by the master speed of rotation device.

Other objects and advantages of my invention will become apparent from the following description taken in connection with the accompanying drawings, it being clearly understood that the same are by way of illustration and example only and are not to be taken as in any way limiting the spirit or scope of my invention. The spirit and scope of my invention is to be limited only by the prior art and by the terms of the appended claims.

Referring to the drawings, in which numerals of like character designate similar parts throughout the several views:

Fig. 1 shows diagrammatically the electric equipment required to drive the alternators operating the synchronizer units controlling pitch change;

Fig. 2 is a partial cross-sectional view of one form of synchronizer unit adapted for application to electrically operated propeller pitch changing mechanisms;

Fig. 3 is a fractional cross-sectional view of another form of synchronizer unit adapted for application to hydraulically operated propeller pitch changing mechanisms;

Fig. 4 shows application of the synchronizer device of Fig. 2 to an electrically operated variable pitch propeller; and Fig. 5 shows application of the synchronizer device of Fig. 3 to a hydraulically operated variable pitch propeller.

Fig. 1 shows, in diagrammatical form, the exact electrical equipment required when a direct current source is available to drive the alternators operating electric synchronizer units controlling propeller pitch change of a multi-engined power plant. With deletion of certain parts hereinafter specifically referred to, the same general "system" may be applied to hydraulic synchronizer units controlling propeller pitch change of multi-engined power plants. Direct current (from a source not shown) is led into a switch panel 1, provided with a tachometer 2 and later referred to parts. An alternator 3, positively coupled to a direct current motor 4, is connected to the tachometer 2 by means of a flexible drive shaft 5. The motor 4 is connected to the aforesaid direct current source by means of double pole switches 6 and 7, a rheostat control 8 and wires 9, 10, and 11; the latter two wires also having common connection with the alternator 3 of the "motor-generator set" (3—4). Upon closing of the switches 6 and 7, the alternator 3 is brought to any desired "speed" through employment of the control 8 in conjunction with the tachometer 2. The three lead wires of the alternator 3 are connected to the inner three of five main wires 12, 13, 14, 15, and 16, which find common connection to each of the two (or more) synchronizer units 17a, 17b, etc. of Figs. 1, 2 and 4, or to the synchronizer units 18a, etc. of Figs. 3 and 5.

In order that the balance of the diagrammatic representations of Fig. 1 may be more readily understood, the physical parts disposition of the "all electric" synchronizer units 17a and 17b of Fig. 1 are next described according to the showing of Fig. 2. In this particular form of synchronizer unit, a split housing of the unit 17a is composed of a housing portion 19 encasing an alternating current motor 20, a housing portion 21 encasing a differential assembly 22, a ball bearing 23 supporting the right extremity of a counter shaft 24, and a housing portion 25 encasing the remaining synchronizer parts. The differential assembly 22 is composed of a combination spider-clutch 26, two differential gears 27, a gear 28 forming one side of the assembly 22 and fixed to the drive shaft of the motor 20 by means of a pin 29, and a gear 30 forming the other or opposite side of the assembly 22 and journalled to a threaded spindle 31 by means of ball bearings 32 and having its right extremity fixed to the slip-disc portion of the spider-clutch 26. It will be noted that a drive shaft 33 is parallelly spaced from the spindle 31 at the extreme left of the housing portion 25 by means of ball bearings 34 and a spacer collar 35. A flexible shaft 36 is secured to the drive shaft 33 by means of a retaining collar 37 and square tipped driving end 38. The inner end of the drive shaft 33 flares out into a disc-like member 39. A gear 40 is fixed to the left face of the member 39 by means of rivets 41. The right-hand face of the member 39 is provided with a pair of projections 42 which carry two combined weights and L-shaped supporting arms 43 by means of bearing pins 43a.

As thus far described, rapid turning of the member 39, by the flexible shaft 36 will cause the combined weight and L-shaped supporting arms 43 to tend to rotate 90 degrees outwardly. To prevent such rotation, the housing portion 25 is provided with a counter weighing or variable loading mechanism 44 composed of a fixed base member 45, with inner bearing lined central tube 46, a compression spring 47, and a displaceable or slidable base 48 longitudinally adjusted upon the outer surface of central tube 46 by means of the threaded spindle 31. The top end of the compression spring 47 is seated upon a flared out portion 49 of a spindle 50 passing through and guided by the inner bearing portion of the central tube 46. The spindle 50 further including a short journal 51 projecting to the left of the flared out portion 49, and a running bearing 52 mounted on the journal 51. The right-hand extremity of the spindle 50 passes through insulating sheets 53a and 53b, backing the base member 45, to seat upon an inwardly pressing bearing block 54 of a U-shaped spring 55, in such a manner that two adjoining contact points 56a and 56b provided upon the free end of the spring 55 are floatingly retained in axial alignment with two oppositely spaced contact points 57 and 58. Mid-spacing of contact points 56a and 56b obtains only when the centrifugal force generated by the rotating weight portions of the arms 43 exactly equals the longitudinal force generated by a predetermined setting of the compression spring 47. If the centrifugal force dominates, the cylindrically cammed surfaces of the inturned portions of the combined weights and L-shaped supporting arms 43 displace the running bearing housing 168 to the right of the parts showing of Fig. 2, thereby closing contact points 56b—58. On the other hand, if the longitudinal force of the spring 47 dominates, the running bearing housing 168 is displaced to the left of the parts showing of Fig. 2, thereby closing contact points 56a—57. It is readily obvious to those skilled in the art that continuing left-hand movement of the slidable base 48 (from the low revolution per minute setting of Fig. 2) will require like continuing increase in the rotation "speed" of the rotating weight portions of the arms 43, if the contact points 56a and 56b are to remain mid-way between the contact points 57 and 58. A brief description of the wiring interconnecting the propeller pitch changing motors 59a and 59b of Figs. 1 and 4 to their power source will complete parts enumeration essential to an understanding of non-synchronous operation of the propeller shown in Fig. 4. Having thus clearly set forth non-synchronous operation of a portion of the structures of Figs. 1, 2 and 4 (which may be stated as old in the art), synchronous operation of the remaining structures of the aforesaid figures (and unknown to the present art) is more readily described and understood.

Let it be assumed that the pilot of a multi-engined aircraft has accomplished normal throttle lever advance for a given flight maneuver and upon reference to his engine tachometers, finds that one engine is turning less than a desired number of revolutions per minute. Disregarding for the moment my ultimate problem of bringing a lagging engine into "true" synchronism with one or more engines already turning at a desired number of revolutions per minute, which problem, it has already been stated, can not be successfully solved by mere "tachometer corrected" throttle readjustment, let it be further assumed that aircraft engine 60a of Figs. 1 and 4 is the lagging engine in question. In the past, the pilot merely brought the throws of switches 61 and 62 into right-hand engagement with terminals C and E of the panel 1 and closed the double pole switch 6. Current from a source of power, not shown, thereupon flowed from terminal A1—2 and E of panel 1 directly to terminals A' and E' of the propeller pitch changing motor 59a, causing decreased pitch rotation of blades 63a and 63b of propeller 64 shown in Fig. 4. The engine 60a thereupon immediately increased in number of revolutions per minute. Upon attainment of desired engine "speed," the pilot simply opened the double pole switch 6. For lagging of engine 60b, the throws of switches 65 and 66 are brought into right-hand engagement with terminals G and I of the panel 1. For over-speeding of engine 60a, switch 61 is thrown to the right and switch 62 is thrown to the left; while over-speeding of engine 60b is corrected by throwing switch 65 to the right and switch 66 to the left. Interconnection between pairs of terminals E—E', D—D', B—B', K—K', I—I', H—H', F—F', and J—J' provided by means of wires 67 through 74, respectively, while terminal Al—2 is connected to main wire 12 by means of wire 75.

In the above method of electrically increasing or decreasing engine revolutions without change in engine throttle setting, no invention is involved in the provision of terminals B and F of the panel 1. In the past, closing of the double pole switch 6 and simultaneous throwing of both switches 65 and 61 to the left, made possible current flow from terminals B and F of the panel 1 directly to terminals B' and F' of the U-shaped springs 55a and 55b, respectively. But a glance at the wiring diagrams of the latter springs and their interconnection to the propeller pitch changing motors 59a and 59b, shown in Fig. 1, immediately suggests two additional methods which are obviously available for increasing or decreasing engine revolutions while maintaining fixed throttle setting. Through innumerable stages of left hand advancement of the base 48 from the positioning shown in Fig. 2, either by manual rotation of a flexible shaft extension fixed to the outer extremity of the threaded spindle 31a or by means of direct interconnection between the threaded spindle 31a and the alternating current motor 20a, the counter-weighing mechanism 44a can be varyingly "weighed" to produce an innumerable series of predetermined engine "speeds." From our previous knowledge of the lateral movements of the spindle 50a, it therefore follows that with any one advancement of the slidable base 48a, lagging of the engine 60a causes closing of contact points 56a—57, while over-speeding thereof causes closing of contact points 56b—58. Further reference to the wiring diagram of Fig. 1 indicates that if the double pole switches 6 and 7 of panel 1 are closed during the aforesaid closing of contact points, terminals B or F are automatically interconnected with terminals E' or I' (causing decreased pitch rotation of propeller blades 63a and 63b of Fig. 4) upon engine lag, while terminals B and F are automatically interconnected with terminals D' or H' (causing increased pitch rotation) upon over-speeding of the engines 60a or 60b.

Having clearly set forth that which is old in the art, I now propose to disclose improvements in synchronizers never heretofore existing. Referring to Fig. 2, I have previously stated that the gear 40 is fixed to the back face of the disc-like member 39. A mating gear 76, fixed to the left extremity of the counter shaft 24 by means of a pin 77, is provided with a dog tooth slot 78. The aforesaid end is journalled to the housing portion 25 by means of the ball bearing 23, a collar 79, and a pin 80. The right-hand extremity of the shaft 24 is further provided with a conventional disc clutch 81. Interposed between the gear 76 and the clutch 81, and substantially encasing the shaft 24, is provided a clutch engaging mechanism 82. The clutch 81 consists of a driven face 83, backed by a collar 84 fixed to the shaft 24 by means of a pin 85; a driving face 86 provided with a dog tooth slot 87; and a disengaging spring 88, encased within spring recesses 89 and 90 provided in the aforesaid clutch faces. The engaging mechanism 82 consists of a hollow iron spindle 91, with centrally disposed and outwardly turned magnet flange 92, and an electric magnet 93. It will be noted that the outer extremities of the spindle 91 are provided with dog teeth 94 remaining at all times in positive sliding engagement with slots 78 and 87 of the gear 76 and the clutch driving face 86. The magnet 93 is composed of a C-shaped magnet 95, fixed to the housing portion 25 by means of screws 96 and lock washers 97; an energizing coil 98, fixed to the right extremity of the magnet 95 by means of screws 99 and lock washers 100; and wires 70—74 and 75 connected respectively with terminal 101 and 102. In the showing of Fig. 1, closing of the throws of switch 103 or switch 104 automatically causes engagement of the clutch 81a or 81b through energization of the clutch engaging mechanism 82a or 82b. The effect of the aforesaid clutch engagement will be set forth in the paragraph immediately following.

The outermost periphery of driven clutch face 83 is provided with a gear portion 105 designed to be held in constant engagement with a gear portion 106 provided upon the left-hand extremity of the gear 30 of the differential assembly 22. The spring 88 of the disc clutch 81 normally holds the driving and driven faces 86 and 83 of the aforesaid clutch apart in such a manner that the gears 30—106 and 105 are free to spin without developing enough torque to make the spider-clutch 26 of the differential assembly 22 turn, even though the gear 28 fixed to the drive shaft of the alternating current motor 20 continues to turn. Referring to Fig. 1, the clutches 81a and 81b are engaged magnetically by means of an energizing coil 82a and an energizing coil 82b fixed to the energizer units 17a and 17b. The clutch engaging mechanism 82a is electrically interconnected to the single pole switch 103 of panel 1 by means of wire 70, while the clutch engaging mechanism 82b is similarly connected to the single pole switch 104 by means of wire 74. As long as the clutch 81 of Fig. 2 remains engaged, the combined gears 30—106 will freely rotate about their ball bearing 32 attachment to the threaded spindle 31 at exactly the same rotational rate as the gear 40 turned by the flexible shaft 36, since the tooth ratio of gears 40 and 76 is the same as that of the gears 105 and 106. It further follows, with reference to the differential assembly 22, that lagging of the engine turned gear 30—106 with respect to the oppositely turning "master speed" gear 28 will produce advancing thread rotation of the threaded spindle 31 (with corresponding left-hand movement of the slidable base 48, spring 47 and flared out spindle portion 49, resulting in closing of contact points 56a—57) while over-speeding of the engine turned gear 30—106 will produce retracting thread rotation (and closing of contact points 56b—58).

To make possible the synchronous operation of the propeller blades 63a and 63b shown in Fig. 4, a wire conduit 107, fixed to a crankcase 108 of the engine 60a by means of a clip 109 and cap screw 110, is provided for housing the wiring scheme of Fig. 1. That much of the aforesaid wiring as pertains to electrical connections between the propeller pitch changing motor 59a, the switch panel 1, and the motor-generator set (3—4) is led through a conduit branch 111 to the rear face of the propeller 64. The remainder of the aforesaid wiring is led through a conduit branch 112 to the synchronizer unit 17a. As has been previously stated, the synchronizer unit 17a is directly connected to the engine 60a by means of the flexible shaft 36 provided with the retaining collar 37 and the square tipped driving end 38.

To operate the all-electrical embodiment of my invention, the aircraft pilot advances all engine throttles to a desired setting and closes the double pole switches 6 and 7 of the panel 1. He thereafter adjusts the rheostat control 8 such that the tachometer 2 indicates a desired engine "speed," as for instance 2000 revolutions per minute. Since the motor-generator set (3—4) of Fig. 1 turns as a single unit, the alternating current motors 20a and 20b of the synchronizer units 17a and 17b will turn at exactly the same number of revolutions per minute. The pilot then closes the single pole switches 103 and 104 of Fig. 1, causing equal and like directional rotation of the gears 40 and 30—106 of the synchronizer units 17a and 17b. It is at once evident that the previously stated inability of an aircraft pilot to successfully "synchronize" several engines of a multi-engined power plant by mere "tachometer corrected" throttle readjustment is no longer involved. Each of the alternating current motors 20 is turning at exactly the same number of revolutions per minute. The fact that the aforesaid "like revolutions" are jointly slightly greater than or slightly less than the "revolutions" indicated on the dial of the tachometer 2 is of no significance. What is essential to note is that a difference of but one revolution per minute between engines 60a and 60b and a predetermined master speed setting of the alternating current motors 20a and 20b will cause one complete revolution per minute of the threaded spindle 31 shown in Fig. 2. Thus, through application of differential actuated contactors to the spring portions of the governors heretofore utlized to control electrically operated variable pitch propellers, I provide a degree of synchronism never before attained.

In Figs. 3 and 5, I disclose the combined electric-hydraulic synchronizer "system" previously referred to in the initial description of Fig. 1. The revised synchronizer unit 18a contains a new housing portion 113 incorporating a fluid control valve 114 for operating a variable pitch propeller having centrifugal weights to turn the propeller blades to their high pitch position. A brief description of Fig. 5 will make more readily understandable actuation of the valve 114 by a revised counter weighing mechanism 115.

A propeller 116 is mounted upon the forward end of an aircraft engine 117. It consists of a hub 118 to which are rotatably mounted blade sockets 119a and 119b for carrying propeller blades 120a and 120b; of centrifugal counter-weights 121a and 121b for automatically maintaining the aforesaid propeller blades in a high pitch position; and of a propeller pitch changing fluid motor 122, an extendable housing portion of which is shown partially retracted within the hub 118. Application of oil pressure within the fluid motor 122 causes the extendable housing portion thereof to assume a series of forwardly progressing positions terminating in the maximum dotted position shown in Fig. 5, at which position the propeller blades 120a and 120b will assume a maximum low pitch position. The synchronizer unit 18a is mounted upon the lower forward portion of a crankcase 123 of the engine 117 by means of cap screws 124 and lock washers 125. The motor 20 of the housing portion 19 is provided with a wire conduit 126 fixed to the crankcase 123 by means of a clip 127, cap screw 128 and lock washer 129. An oil inlet 130, provided upon the exterior surface of the housing portion 113, is directly connected with the oil pump providing general lubrication for the engine 117 by means of an exterior oil line 131 and such additional lines within the crankcase 123 as may be required. An oil inlet-outlet 132 is operably connected with the propeller pitch changing fluid motor 122 by means of an exterior oil line 133 and further internal pipings and slip rings contained within the crank case 123 and the hub 118. Lastly, an oil outlet 134 is operably connected with the oil sump of the engine 117 by means of an exterior oil line 135 and such further internal piping as may be required. Briefly restated, to obtain maximum low pitch position of the propeller blades 120a and 120b, oil must flow from pump to inlet 130 and from thence through inlet-outlet 132 to the motor 122. On the other hand, if decrease in engine revolutions is desired, oil must drain from the motor 122 into inlet-outlet 132, and from thence return to the engine sump through the outlet 134. The aforesaid oil drainage is accelerated by the centrifugal action of the counter-weights 121a and 121b which automatically decrease unwanted increases in the "speed" of the engine 117 through increase in propeller blade pitch angle.

The detailed construction of the fluid control valve 114 and revised counter-weighing mechanism 115 is shown in Fig. 3. A piston chamber 136 is provided with a header 137 (fixed by means of screws 138 and lock washers 139), a fluid by-pass 140 and fluid ports 141, 142, and 143. The port 141 leads directly into the oil inlet 130, the port 142 similarly into the oil inlet-outlet 132, and the port 143 into the outlet 134 of the new housing portion 113. As long as the combined weight and L-shaped supporting arms 43 retain the "neutral" positioning of Figs. 2 and 3, like "neutral" positioning of the piston and rod assembly 144 obtains; i. e., a head 145 of the assembly 144 is centrally disposed with reference to closing of the port 142, while a head 146 of the assembly 144 is sufficiently positioned to the right of the port 141 to avoid any possibility of over-lapping the same. It should also be noted that extreme right-hand actuation of the piston and rod assembly 144 positively closes off the port 141.

The right-hand extremity of new spindle 147 is provided with a flattened end 148 adapted to receive the upper end of a yoked lever 149. The lever 149 depends from a mounting pin 150 fixed to a yoked boss 151 forming a part of new insulating sheet 152. A driving pin 153, fixed to the end 148 of spindle 147, slides longitudinally in an elongated slot 154 of the lever 149 such that right-hand movement of the spindle 147 will cause counter-clockwise movement of the lever 149 in response to "over-running" of the flexible shaft 36 with respect to the alternating current motor 20. On the other hand, "under running" of the flexible shaft 36 with respect to the alternating current motor 20 causes clockwise movement of the lever 149 such that an elongated slot 155 provided in the lower extremity thereof will cause a driven pin 156, fixed to the left extremity of the piston and rod assembly 144, to move to the left.

Right-hand movement of the piston and rod assembly 144 has the following effect. The head 145 uncovers the port 142 (connected to fluid motor 122) allowing oil therefrom to escape to the engine sump through the port 143. Regardless of the particular "degree" of engine throttle setting, the aforesaid escapage of oil is attended with immediate increase in the pitch angle of the propeller blades 120a and 120b. On the other hand, left-hand movement of the piston and rod assembly 144 causes the head 145 to uncover the port 142 to intercommunication with the port 141, whereupon oil under pressure will immediately flow to the fluid motor 122 (causing decrease of propeller blade pitch). In both of the aforesaid movements, that portion of the piston chamber 136 lying to the immediate right of the head 146 is freely vented to the engine oil sump by means of the bypass 140.

Fig. 3 also shows the detailed construction of the combination spider-clutch 26 driving the threaded spindle 31. A spider 157 is provided with gear journals 158, washers 159, and cotter pins 160 for retaining the differential gears 27; with a clutching surface 161; and with a clutch surface centralizing bearing 162. The mating portion for the spider 157 consists of a clutch plate 163, a backing plate 164 fixed to the threaded spindle 31 by means of a pin 165 and four plate separating springs 166. It will be noted that maximum expansion of the counter weighing mechanism 44 is limited by seating of the right extremity of the sliding base 48 upon the left extremity of a bushing 167 utilized as a support for the central portion of the threaded spindle 31. On the other hand, maximum contraction of the counter weighing mechanism 44 will occur upon closing of the loops of the compression spring 47. It is therefore essential that the spindle 31 entirely cease rotation when either of the aforesaid limiting positions of the counter weighing mechanism 44 has been reached. This is accomplished by slippage between the clutch surface 161 and the clutch plate 163 of the combination spider-clutch 26.

Although the description is specific to the illustrations in the drawings, it is to be understood that there may be numerous departures therefrom which will still be within the field and scope of my invention, so that I do not wish to be restricted thereto, but only in so far as the appended claims are so limited.

I claim:

1. In a mechanism for synchronizing the speed of a controlled engine with the speed of a reference speed means, a centrifugally actuated governor driven by said controlled engine and having variable loading means, a differential mechanism disposed between said engine and reference speed means and having its opposite sides driven, respectively, by said controlled engine and said reference speed means, a displaceable member operatively connected with said variable loading means and associated with said differential mechanism to be displaced by the latter upon a variation in the speed of said engine with respect to said reference speed means, means for drivingly connecting and disconnecting said controlled engine with said reference speed means through said differential including clutch means between one side of said differential and its corresponding drive, and means for rendering said displaceable member inoperative to act on said variable loading means upon a predetermined change in condition of said controlled engine and said reference speed means.

2. In a synchronizing device including a governor for controlling the speed of a rotating member provided with means for regulating said governor, a reference speed driven member, means operative in response to a difference in the speeds of said rotating member and said reference speed driven member for varying the regulation of said governor, means for rendering said last mentioned means inoperative including means, operative at will, for effecting a disengagement or engagement of said rotatable members through said speed difference responsive means, and means operative upon a predetermined change in the condition of said rotatable members to drivingly disengage the same through said speed difference responsive means.

3. In a mechanism for synchronizing the speed of a controlled engine with the speed of a constant speed means, a centrifugally actuated governor driven by said controlled engine and having variable spring loading means, a differential mechanism disposed between said engine and constant speed means and having its opposite sides driven, respectively, by said controlled engine and said constant speed means, a spindle having one end operatively connected with said variable spring loading means and the other end fixed to the spider portion of said differential mechanism to be displaced by the latter upon a variation in the speed of said engine with respect to said constant speed means, and means disposed between said engine and the engine driven side of said differential for connecting or disconnecting the same.

4. In a mechanism for synchronizing the speed of a controlled engine with the speed of a constant speed means, a centrifugally actuated governor driven by said controlled engine and having variable spring loading means, a differential mechanism disposed between said engine and constant speed means and having its opposite sides driven, respectively, by said controlled engine and said constant speed means, a spindle having one end operatively connected with said variable spring loading means and the other end fixed to the spider portion of said differential mechanism to be displaced by the latter upon a variation in the speed of said engine with respect to said constant speed means, and means disposed between said engine and the engine driven side of said differential for rendering the latter inoperative.

5. In a mechanism for synchronizing the speed of a controlled engine with the speed of a constant speed means, speed control means for varying the speed of the controlled engine, a centrifugal governor driven by said engine, connecting means between said governor and said engine speed control means for actuation of said control means to increase or decrease the speed of said engine on its departure from the speed setting of said governor, a three-legged differential mechanism disposed between said engine and said constant speed means and having a first leg driven by said controlled engine, a second leg driven by said constant speed means, and third leg operatively connected with said governor to serve as a modifier of the speed setting thereof and associated with said first and second legs to be displaced thereby upon a variation in the speed of said engine with respect to said constant speed means.

6. In a mechanism for synchronizing the speed of a controlled engine with the speed of a reference speed means, speed control means for varying the speed of the controlled engine, a centrifugal governor driven by said engine, connecting means between said governor and said engine speed control means for actuation of said control means to increase or decrease the speed of said engine on its departure from the speed setting of said governor, a three-legged differential mechanism disposed between said engine and reference speed means and having a first leg driven by said controlled engine, a second leg driven by said reference speed means, a third leg operatively connected with said governor to serve as a modifier of the speed setting thereof and associated with said first and second legs to be displaced thereby upon a variation in the speed of said engine with respect to said reference speed means, and means for effecting an engagement or disengagement of the said controlled engine and said reference speed means through said differential at will.

7. In a mechanism for synchronizing the speed of a controlled engine with the speed of a reference speed means, speed control means for varying the speed of the controlled engine, a centrifugal governor driven by said engine, connecting means between said engine speed control means for actuation of said control means to increase or decrease the speed of said engine on its departure from the speed setting of said governor, a three-legged differential mechanism disposed between said engine and reference speed means and having a first leg driven by said controlled engine, a second leg driven by said reference speed means, a third leg operatively connected with said governor to serve as a modifier for the speed setting thereof and associated with said first and second legs to be displaced thereby upon a variation in the speed of said engine with respect to said reference speed means, and electromagnetic means for effecting an engagement or disengagement of the said controlled engine and said reference speed means through said differential.

8. A synchronizing system for prime movers comprising in combination an engine, speed control means for varying the speed of the engine, a constant speed motor including means for adjusting the speed thereof to a selected value, a speed responsive centrifugal governor driven by said engine, connecting means between said governor and said engine speed control means for actuation of said control means to increase or decrease the speed of said engine on its departure from the speed setting of said governor, a modifier for said governor operative to vary the speed setting thereof, said governor being operative to vary the speed of said engine upon any variation in the engine speed from the speed determined by the instant speed setting of said modifier, a three-element differential having one element rotatably connected to be driven by said engine in accordance with the speed thereof, a second element rotatably connected to said constant speed motor to rotate in accordance with the speed thereof and a third element interconnected to said first and second elements and operatively connected to said governor modifier to vary the speed setting of said governor in accordance with the difference in speeds of said engine and said constant speed means.

9. The combination with an engine, a propeller for absorbing the power of said engine and means for changing the pitch of said propeller to thereby vary the speed of the engine, of motor means driven at a constant speed, a centrifugal governor driven by said engine and including a modifier, connecting means between said governor and said means for changing the pitch of the propeller for actuation of the pitch-changing means to increase or decrease the speed of said engine on its departure from the speed setting of said governor, a three-legged differential mechanism disposed between said engine and said constant speed motor means and having a first leg driven by said engine, a second leg driven by said constant speed motor means, and a third leg operatively connected to said governor modifier and to said first and second legs of differential mechanism to act upon said pitch-changing means in accordance with the speed difference between the speed of the engine and the speed of said constant speed motor means.

10. The structure as claimed in claim 9, including manually controlled means operable at will for rendering said differential inoperative to act on said governor modifier.

DANIEL A. DICKEY.